United States Patent [19]

Ruggles

[11] 4,121,114
[45] Oct. 17, 1978

[54] STATION TIMING SELECTION CIRCUIT FOR IRRIGATION CONTROLLER

[75] Inventor: Richard L. Ruggles, Mount Baldy, Calif.

[73] Assignee: Clemar Manufacturing Corporation, Azusa, Calif.

[21] Appl. No.: 749,386

[22] Filed: Dec. 10, 1976

[51] Int. Cl.² .............................................. H01H 7/00
[52] U.S. Cl. ..................................... 307/141; 239/70; 137/624.2; 307/41
[58] Field of Search .................. 307/141, 141.4, 141.8, 307/108, 293, 41; 340/309.1; 320/1; 361/195; 137/624.2; 239/69, 70

[56] References Cited

U.S. PATENT DOCUMENTS

| 3,320,431 | 6/1967 | DeBough et al. | 307/141.4 X |
| 3,787,728 | 1/1974 | Bayer et al. | 307/141 |

Primary Examiner—Robert K. Schaefer
Assistant Examiner—Morris Ginsburg
Attorney, Agent, or Firm—Fulwider, Patton, Rieber, Lee & Utecht

[57] ABSTRACT

An improved irrigation control system of the type having a number of irrigation stations to be actuated sequentially, in which selected stations can be actuated for a relatively long time and the others for a relatively short time. In one embodiment, an additional capacitor is automatically connected in parallel with an existing timing capacitor at a time when shrub-watering stations requiring long-term irrigation have been scheduled for operation, when the system is positioned at a shrub-watering station, and when a switch is positioned to select long-term irrigation. In another embodiment, an additional capacitor is automatically connected in parallel with the existing timing capacitor when any one of a selected group of stations is actuated. The additional capacitor in this latter embodiment is switched in by means of a relay which is energized through a triac connected in series therewith, the triac being triggered by a gating signal derived from an actuating voltage applied to a valve solenoid associated with any of the selected group of stations.

8 Claims, 2 Drawing Figures

STATION TIMING SELECTION CIRCUIT FOR IRRIGATION CONTROLLER

BACKGROUND OF THE INVENTION

The present invention relates generally to irrigation control systems and, more particularly, to such systems which may have a mixture of some valves used primarily in lawn irrigation and other valves used primarily in irrigation of shrubs or trees. In the irrigation of lawns, such as on golf courses and the like, the usual requirement is for frequent but relatively light watering. In contrast, irrigation of shrubs and trees generally requires infrequent but relatively deep watering.

Typically, irrigation control systems of the foregoing general type are operable to control a plurality of irrigation valves located at remote points in a golf course, or other property to be irrigated. The control system usually includes a time clock by means of which irrigation can be initiated at any selected hour, or hours, on any selected day, or days, of the week. When irrigation is so initiated, the valve or valves at a first irrigation station are first turned on, and left on for a time determined by a separate station timer. When this time has elapsed, the station-one valves are turned off and the valve or valves associated with a second station are turned on, to be timed by a separate station timer. This process continues until all the station valves have been operated for their preselected times.

In control systems which allow for a mixture of lawn sprinkling valve stations and shrub irrigation stations, the shrub stations are usually the last ones in the sequence, and they may be skipped entirely if the user of the system elects to do so. Thus, the lawn sprinkler stations could be operated, for example, on Monday, Wednesday and Friday, with the shrub stations being operated only on Friday, directly after operation of the lawn stations on that day.

On older control systems, the station timers for each valve station are resistor-capacitor (R-C) timing circuits, but these are inherently unsuitable for measuring relatively long time periods. More modern systems incorporated digital timing circuits which utilize an R-C circuit to provide a basic timing signal, and a digital counter to obtain any desired time interval over a relatively wide range.

Until quite recently, shrubs and trees were irrigated in much the same manner as lawns, i.e., using an aerial spray of water. Now it has become more common practice to irrigate shrubs and trees at ground level by a relatively slow flow of water from a drip irrigator. The optimum times of irrigation for drip irrigation usually exceed the normal times for spray irrigation of shrubs or trees by a factor of four or five. However, irrigation controllers available heretofore which have been capable of providing shrub irrigation can do so only for relatively short times, suitable for spray irrigation. In many applications, however, there is a requirement for a mixture of short-term spray irrigation and long-term drip irrigation of shrubs, and it is highly desirable to be able to selectively assign various shrub irrigation valves as either spray or drip irrigation stations. The present invention is directed to these ends.

SUMMARY OF THE INVENTION

The present invention resides in an improved irrigation controller of the aforedescribed general type, in which provision is made for selectively designating stations for either short-term or long-term irrigation. Briefly, and in general terms, the improvement includes an additional capacitor connectable in parallel with the timing capacitor of the system, and means for automatically switching the capacitor into connection with the timing capacitor for selected stations.

In one embodiment of the invention, the additional capacitor is connected to the timing capacitor through first switch means which is conductive only when the irrigation controller is positioned to actuate a shrub station, and then in series through second switch means which is conductive only when shrub irrigation is scheduled for activation, and then in series through third switching means which is conductive only when operator-selected. Thus, when shrub irrigation is scheduled and the control system is positioned to actuate a shrub station, the additional capacitor will be connected to the existing timing capacitor only if the third switching means is closed, to select long-term shrub irrigation. If the third switching means is open, short-term shrub irrigation is selected.

In a second embodiment of the invention, the additional capacitor is connected in parallel with the timing capacitor on the closure of a pair of relay contacts. The relay is energized only when power is applied to one of a selected group of shrub station valves. More specifically, the relay is connected across a power supply through a triac, and connection is made between each of the selected group of shrub station valves to the gate terminal of the triac, through a resistance network. When one of the selected group of shrub station valves is actuated, the triac becomes conductive and the relay is energized, thereby switching in the additional capacitor and automatically increasing the station time for that particular valve.

It will be apparent from the foregoing that the present invention represents a significant advance in the field of irrigation control systems. In particular, it provides a hitherto unavailable technique for selectively operating some irrigation stations for relatively long times, for drip irrigation, and others for relatively short times, for spray irrigation. Other aspects and advantages of the invention will become apparent from the following more detailed description taken in conjunction with the accompanying drawings.

DETAILED DESCRIPTION

Figure 1:
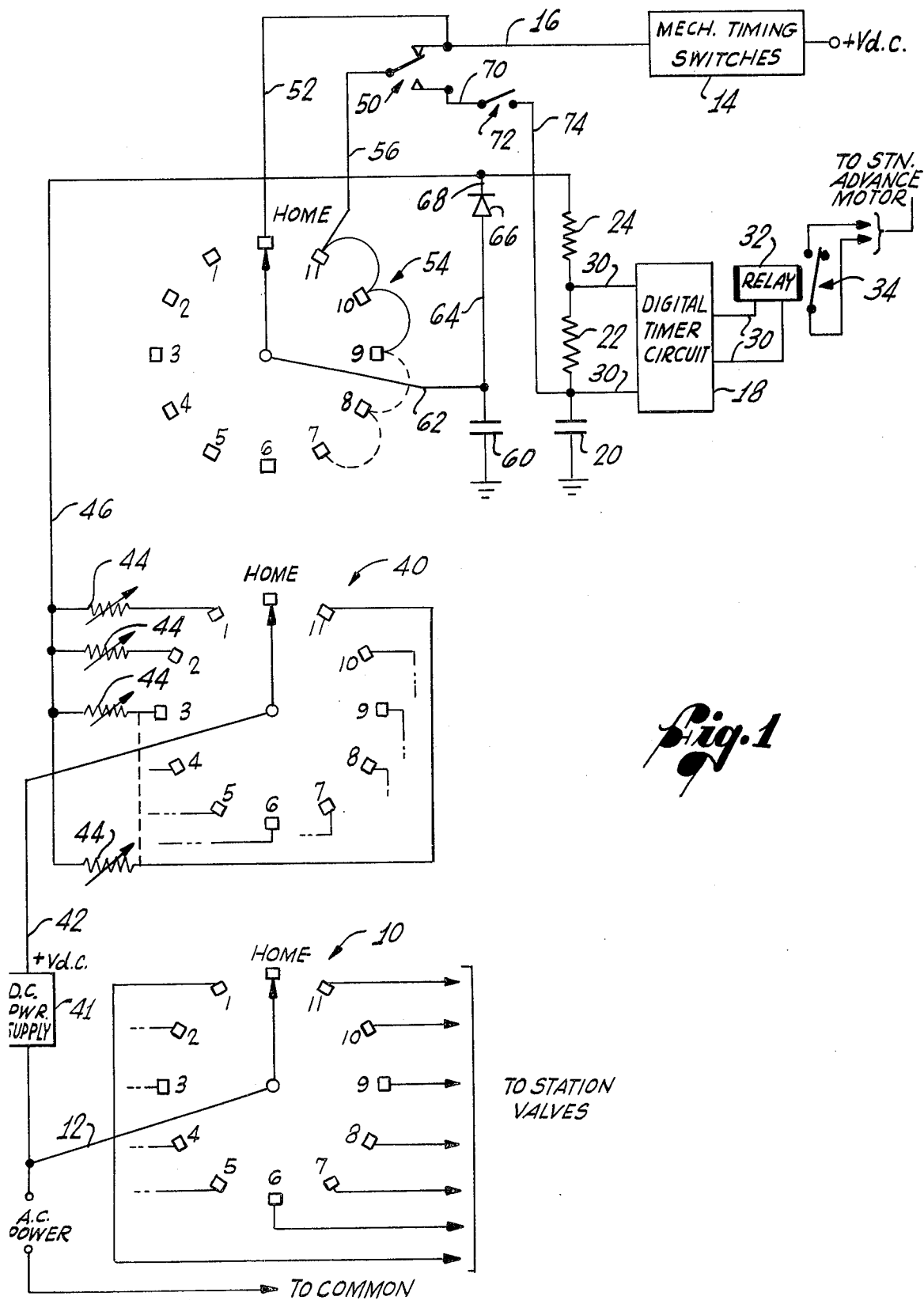
FIG. 1 is a schematic diagram of an irrigation control system of which conventional portions have been simplified or omitted, showing the improvement of the invention in one of its embodiments.

As shown in the drawings for purposes of illustration, the present invention relates to an irrigation control system having a number of shrub irrigation stations which are selectively operable for either relatively long or relatively short watering times, depending upon the particular requirements of the site to be irrigated.

In the conventional control system illustrated in FIG. 1, which shows an eleven-station system, there is a rotary switch, indicated by reference numeral 10, having a movable contact, and eleven fixed contacts corresponding to the eleven stations in the system. A voltage, usually in alternating-current form, is applied to the movable contact, as shown by the line 12, and connection is made from each of the station contacts to a corresponding station valve solenoid (not shown), so that as the rotary switch 10 is advanced from station to station the supply voltage is applied to each of the station solenoids in turn, thereby actuating the valves at those stations. The rotary switch 10 also includes a "home" position, the position of the switch when the irrigation cycle is complete.

Basically, the start of an irrigation cycle is controlled by a timing clock (not shown) which, at preselected times on preselected days, actuates mechanical timing switches, indicated at 14, and connects a supply voltage to a line 16. As will be discussed, this has the effect of driving the rotary switch 10 to the station-one position, and thereby initiating irrigation at station one. Typically, the timing switches 14 are actuated by mechanical pins (not shown) which can be set to initiate irrigation at a particular hour of the day for selected days of the week. The specific means by which these functions are performed are not critical to the present invention and are not further described herein.

Timing of irrigation at the first and subsequent valve stations is effected by a digital timer circuit 18, the basic frequency of which is determined by the capacitance of a timing capacitor 20 and the resistance of two series resistors 22 and 24, as well as any other resistance value in series with these. The digital timer circuit 18 generates an output on lines 30 after a time which is in part dependent on the time constant of the circuit comprising the capacitor 20 and resistors connected in series with it. The lines 30 are connected to a relay 32, actuation of which closes a switch 34 and thereby energizes a station advance motor (not shown). The station advance motor advances the rotary switch 10 by one switch position, and also advances other rotary switches to be described, thereby conditioning the control system to actuate the next station and begin timing again. When timing at the next station is completed, the station advance motor is again energized and the process is repeated until the "home" position is reached.

Timing at individual stations is controlled in part by means of a second, twelve-position, rotary switch 40, similar to the first switch 10. The switch 40 is connected to a direct-current power supply, indicated at 41, over line 42 terminating at the movable contact of the switch. The fixed contacts of the switch 40 are connected to corresponding variable resistors 44, which are, in turn, connected by a common line 46 to one terminal of the resistor 24, the other terminal of which is connected to the digital timer circuit 18 and to the resistor 22. It will be appreciated that, by suitable adjustment of the individual variable resistors 44, the time constant of the circuit comprising the timing capacitor 20 and the resistors in series therewith can be effectively changed as the system is stepped from station to station. In practice, each of the variable resistors 44 will include an additional rotary switch (not shown), and the resistors can be shared among the stations by suitable switching circuitry, all of which has been omitted for clarity and to highlight the present invention.

The power supply voltage on line 16 is connected to a fixed contact of a single-pole double-throw switch 50 which is, in turn, connected by line 52 to the "home" contact terminal of a third rotary switch 54. The latter switch 54 is used to distinguish stations associated with lawn watering from stations associated with shrub watering. A selected number of the fixed contacts on the switch 54 are together connected by line 56 to the movable contact of the switch 50. In FIG. 1, stations number 9, number 10 and number 11 are shown connected in this manner, by way of example. Normally, the switch 54 is used in conjunction with the switch 50, which is a shrub selection switch, to quickly bypass the shrub stations unless shrub irrigation has been selected by closure of the switch 50, which would occur only when shrub irrigation had been scheduled for the irrigation cycle in progress. Prior to this invention, however, there was no way to operate the shrub stations selectively, on either a long-term or a short-term basis.

In accordance with the present invention, as it applies to the embodiment illustrated in FIG. 1, an additional capacitor 60 has one terminal connected in common with a terminal of capacitor 20, and has its other terminal connected by line 62 to the movable contact of the rotary switch 54, and by line 64 to the anode terminal of a diode 66, the cathode of which is connected by line 68 to the line 46, and thence to the resistor 24.

At the start of an irrigation cycle, a power supply voltage is applied to line 16 and, whether or not shrub irrigation has been scheduled, the voltage is transmitted through line 52, through the "home" terminal and movable contact of the rotary switch 54, through lines 62 and 64, through the diode 66, and thence to the resistor 24. Resistors 24 and 22 have relatively low resistance values, resulting in a very short time constant being associated with the digital timer circuit 18. This has the effect of actuating the relay 32 after a very short time delay, and thereby closing switch 34 and operating the station advance motor to move the control system to the first station position. The system will then commence watering at station one, which is a lawn station, and will continue watering until the predetermined time for that station has elapsed, as determined primarily by the variable resistor 44 associated with station one. Then the controller will be advanced to station two, and so on until the first shrub station is reached, which is station nine in the illustrated system. At this point, the shrub selection switch 50 comes into play. If shrub irrigation has not been scheduled for the current irrigation cycle, the switch is in the position illustrated, and supply voltage will be transmitted through line 56, through the rotary switch 54 and the diode 66, and thence to the resistor 24, as at the start of the irrigation cycle. This supply voltage applied directly to resistor 24 will have the effect of stepping the controller rapidly through the shrub stations until the "home" position is reached, at which time the supply voltage will be removed from line 16 by conventional mechanical means (not shown), typically employing yet further rotary switches operating in unison with the ones illustrated.

If shrub irrigation has been scheduled for the current irrigation cycle, the switch 50 will be actuated, and a connection will be established from the additional capacitor 60, through line 62, through the rotary switch 54, and thence through line 56 to switch 50. The other fixed contact of switch 50 is connected by line 70 to a single-pole single-throw switch 72, and thence by line 74 to the junction point between timing capacitor 20 and resistor 22. Thus, if the switch 72 is closed, the additional capacitor 60 will be connected in parallel with the timing capacitor 20, and the shrub stations will be timed for relatively long periods. If the switch 72 is open, only the original timing capacitor 20 will be connected to the timer circuit 18, and the shrub stations will be timed for relatively short periods.

Figure 2:
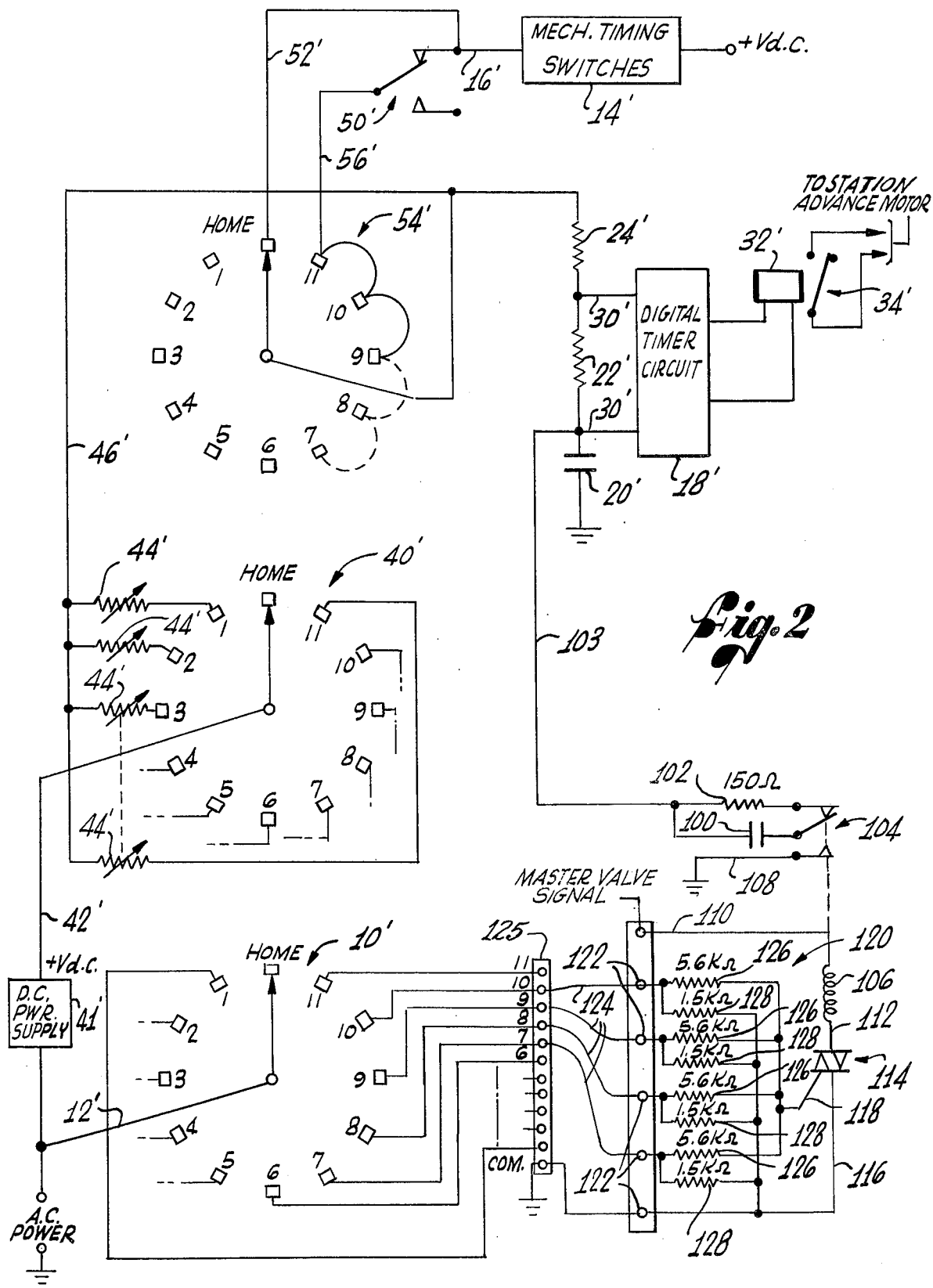
FIG. 2 is a schematic similar to FIG. 1, illustrating an alternate embodiment of the invention.

In the other illustrated embodiment of the invention, shown in FIG. 2, elements which have counterparts in FIG. 1 have been numbered with corresponding but primed reference numerals. For convenience, this embodiment is illustrated for use in conjunction with the same general type of control system as was shown in FIG. 1, i.e., including a shrub selection switch 50' and rotary switches 10', 40' and 54'. However, as will soon be apparent, the embodiment of the invention now to be described could be used in conjunction with almost any multi-station irrigation control system, regardless of whether shrub stations are included. In this embodiment, an additional capacitor 100 has one terminal connected both to a resistor 102 and, by line 103, to the ungrounded terminal of timing capacitor 20'. The other terminal of capacitor 100 is connected to the movable contact of a single-pole double-throw switch 104 associated with a relay coil 106. The other terminal of the resistor 102 is connected to one of the fixed contacts of the switch 104, and the other fixed contact is grounded, as shown by line 108. When the relay coil 106 is not energized, the movable contact of the switch 104 is in the position illustrated, and the capacitor 100 is effectively short-circuited and discharged through the resistor 102. When the relay coil 106 is energized, the movable contact of the switch 104 operates to connect the capacitor 100 in parallel with the timing capacitor 20' and thereby increase the time constant associated with the timer circuit 18'.

The relay coil 106 is connected by line 110 to a source of alternating-current power, which may be conveniently derived from a "master" valve signal, a supply voltage which is present whenever any of the station valves is actuated. The other side of the relay coil 106 is connected by line 112 to one main terminal of a triac 114, the other main terminal of which is connected by line 116 to a common or grounded terminal.

The gate terminal of the triac 114 is connected by line 118 to a resistor network 120 which has four input terminals 122. The terminals 122 may be connected to any selected group of shrub station valve signals by movable jumper cables 124. In practice, the station valve actuating signals will be conveniently available on a terminal board, indicated at 125, and the four input terminals 122 of the resistor network 120 can be also brought out to a nearby terminal board. The jumper cables 124 can then be conveniently connected to select particular stations for long-term irrigation. Each of the input terminals 122 is connected through a resistor 126 to the line 118 which is connected to the gate of the triac 114. Each of the terminals 122 is also connected through a resistor 128 of relatively low value, and thence in common to line 116 and to the grounded or common terminal.

When one of the selected stations is actuated, supply voltage appears on one of the corresponding terminals 122, and is impressed, through the resistance network 120, on the gate of the triac 114, thereby firing the triac and energizing the relay coil 106. More specifically, when a voltage is applied at one of the terminals 122, current flows in all of the resistors in the network 120, and there is a substantial drop in voltage from the energized terminal 122 to the gate of the triac 114, but there is still sufficient voltage to trigger the triac. However, because of the choice of values of the resistors 126 and 128, the voltage at the gate of the triac is further reduced if the flow of current back to the others of the terminals 122 is considered, so that only a very low voltage is impressed on the other three of the terminals 122, and there is no unwanted feedback of voltage to the valves at other stations.

It will be apparent from the foregoing that the present invention constitutes a significant advance in the field of irrigation control systems. In particular, the invention allows selected irrigation stations to be timed on either a long-term or a short-term basis. It will also be appreciated that, although specific embodiments have been illustrated and described in detail herein by way of example, various modifications may be made without departing from the spirit and scope of the invention. Accordingly, the invention is not to be limited except as by the appended claims.

I claim:

1. In an irrigation control system having a plurality of irrigation stations which are actuated sequentially in a scheduled irrigation cycle, station timing means for timing the irrigation at each station, and a timing capacitor and timing resistor, both associated with said station timing means, the improvement comprising:
   an additional capacitor connectable in parallel with said timing capacitor; and
   means for connecting said additional capacitor in parallel with said timing capacitor for selected ones of said plurality of irrigation stations;
   whereby said means for connecting said additional capacitor provides for operation of selected ones of said plurality of irrigation stations for relatively long station times.

2. The improvement set forth in claim 1, wherein said means for connecting said additional capacitor includes:
   first switch means which is conductive only when said control system is timing one of a designated group of stations in the irrigation cycle;
   second switch means operable to include or exclude said designated group of stations in the irrigation cycle, said second switch means being conductive only when said designated group of stations has been included in the irrigation cycle;
   third switch means which is manually operable to select long-term irrigation; and
   means for rapidly bypassing irrigation at said designated group of stations when said second switch means is operated to exclude said designated group;
   said first, second and third switch means being connected in series between said additional capacitor and said timing capacitor.

3. The improvement set forth in claim 2, wherein:
   said first switch means includes a rotary switch having a movable contact connected to said additional capacitor and a plurality of fixed contacts corresponding to said plurality of irrigation stations, those of said contacts corresponding to said designated group of stations being connected in common to said second switch means;
   said second switch means includes a movable contact connected to said first switch means and a fixed contact connected to said third switch means; and
   said third switch means is connected to said timing capacitor.

4. The improvement set forth in claim 3, wherein said means for rapidly bypassing irrigation includes:
   a diode connected to conduct current from said movable contact of said first switch means to said timing resistor; and a second fixed contact of said second switch means, connectable to a power supply voltage;

whereby, when said second switch means is operative to transmit the power supply voltage from its second fixed contact to the fixed contacts of said first switch means corresponding to said designated group of stations, and when said first switch means is located at a position corresponding to one of said designated group of stations, then said voltage is applied through said first switch means and said diode to said timing resistor, to speed up said station timing means substantially and thereby bypass said designated group of stations.

5. The improvement set forth in claim 1, wherein said means for connecting said additional capacitor includes:

relay means having contacts switchable to connect said additional capacitor into parallel connection with said timing capacitor;

gated switching means connected in series with said relay means to energize said relay means selectively; and circuit means selectively connectable to valve actuation signal terminals corresponding to selected ones of said plurality of irrigation stations, and connected to the gate terminal of said gated switching means;

whereby actuation of one of the selected stations causes gating of said gated switching means, consequent energization of said relay means, and connection of said additional capacitor in parallel with said timing capacitor.

6. The improvement set forth in claim 5, wherein said circuit means includes:

a plurality of input terminals;

a plurality of jumper cables for connecting said input terminals to selected station valve signal terminals;

a plurality of first resistors connected between said gate terminal and respective ones of said input terminals; and a plurality of second resistors connected between a common terminal and respective ones of said input terminals;

whereby said pluralities of first and second resistors are operative to transmit a gating voltage signal from any one of said input terminals to said gate terminal, but to prevent substantial feedback to any others of said input terminals.

7. The improvement set forth in claim 5, wherein:

said additional capacitor has one terminal connected to one terminal of said timing capacitor;

said contacts of said relay means include a movable contact connected to the other terminal of said additional capacitor, a first fixed contact connected to the other terminal of said timing capacitor, and a second fixed contact;

said improvement further includes an additional resistor of relatively low resistance value connected between said second fixed contact and the first-mentioned terminal of said additional capacitor, whereby said additional resistor provides a discharge path for said additional capacitor when said relay means is not operative to connect said additional capacitor in parallel with said timing capacitor.

8. The improvement set forth in claim 5, wherein said gated switching means is a triac.

* * * * *